United States Patent [19]

Guleserian

[11] 4,229,403

[45] Oct. 21, 1980

[54] METHOD OF ASSEMBLING A FAULT LIMITER BY MOLDING A RIGID HOUSING ABOUT A NON-RIGID SUBASSEMBLY

[75] Inventor: John E. Guleserian, Prairie View, Ill.

[73] Assignee: S&C Electric Company, Chicago, Ill.

[21] Appl. No.: 8,424

[22] Filed: Feb. 1, 1979

[51] Int. Cl.³ .............................................. B29C 6/04
[52] U.S. Cl. ..................................... 264/263; 29/623;
   174/52 PE; 264/230; 264/262; 264/266;
   264/272
[58] Field of Search ............... 264/272, 230, 262, 263,
   264/266; 29/623; 174/52 PE; 337/186, 276

[56] References Cited

U.S. PATENT DOCUMENTS

| | | | |
|---|---|---|---|
| 3,297,819 | 1/1967 | Wetmore | 264/230 |
| 3,800,262 | 3/1974 | Cinquin | 337/276 |
| 4,001,655 | 1/1977 | Voyles et al. | 174/52 PE |
| 4,035,753 | 7/1977 | Reeder | 337/186 |

FOREIGN PATENT DOCUMENTS 1143268  2/1963  Fed. Rep. of Germany ........... 264/272

Primary Examiner—James B. Lowe
Attorney, Agent, or Firm—John D. Kaufmann

[57] ABSTRACT

A helical fusible element is supported by an element support member which is disposed between two terminal assemblies, which terminal assemblies are of larger diameter than the diameter of the combination of the fusible element and the element support member. A flexible container is formed around the element support member and the fusible element on the circumference of the terminal assemblies to enclose these elements except for the ends of the terminal assemblies. A hole through the enclosure is provided through which a suitable particulate arc quenching material is admitted so as to completely fill the enclosed region. The hole is then sealed. The completed subassembly is then encapsulated in a resinous compound using a split mold. The contraction of the resinous compound as it cures compresses the flexible container and the particulate arc quenching material, thereby insuring maximum density of the arc quenching material without interfering with the desirable porous nature of the arc quenching material.

8 Claims, 8 Drawing Figures

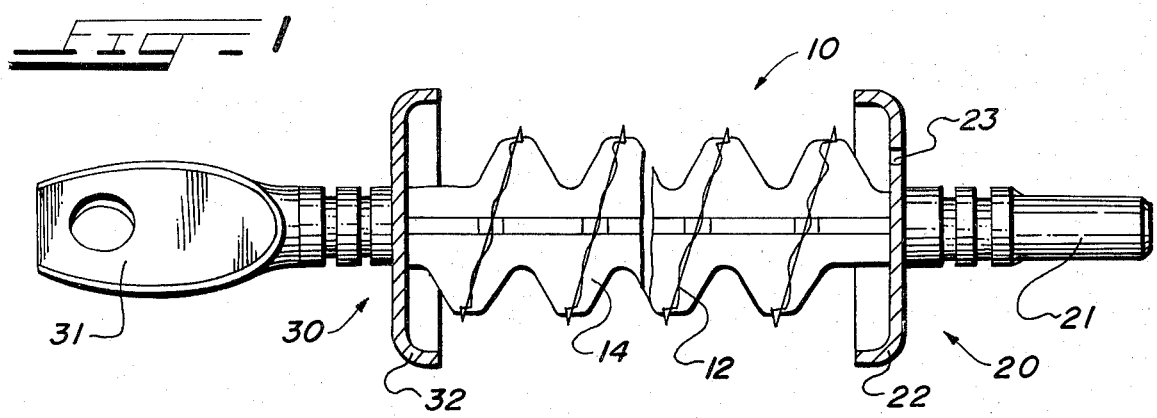
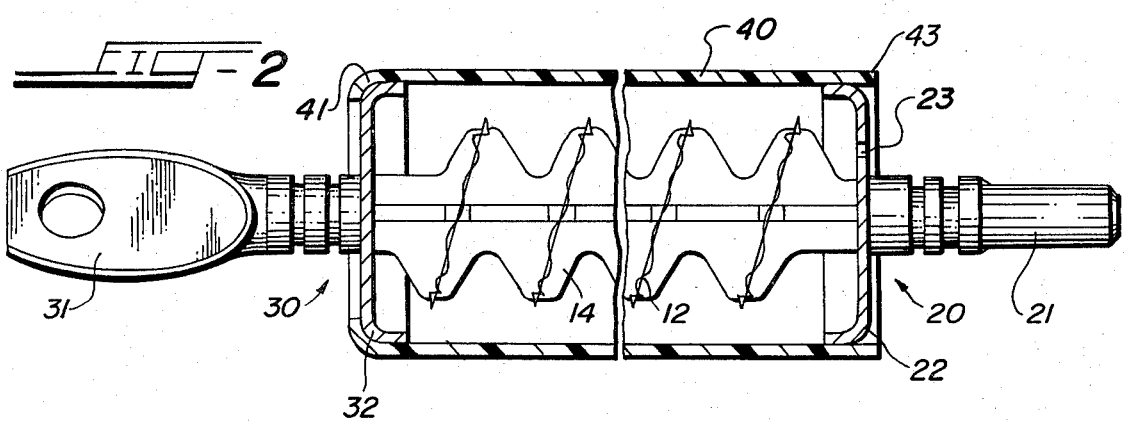
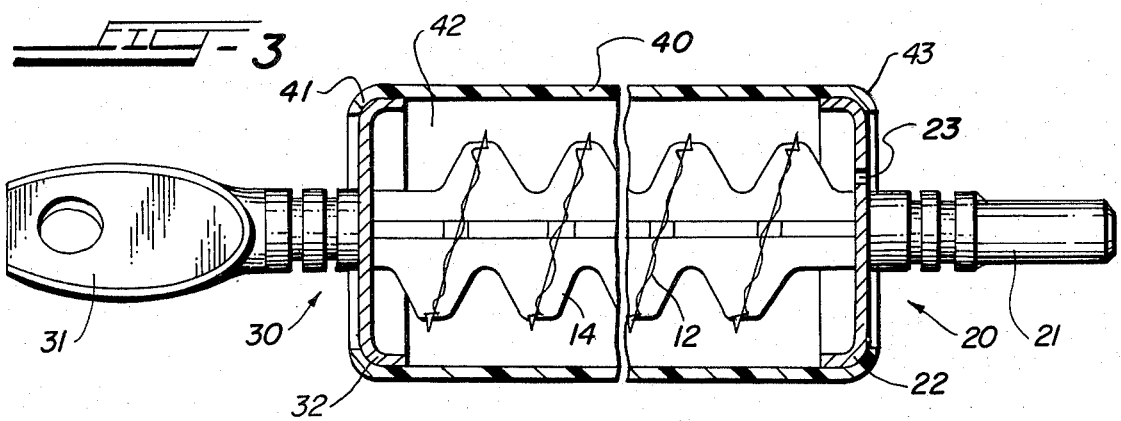
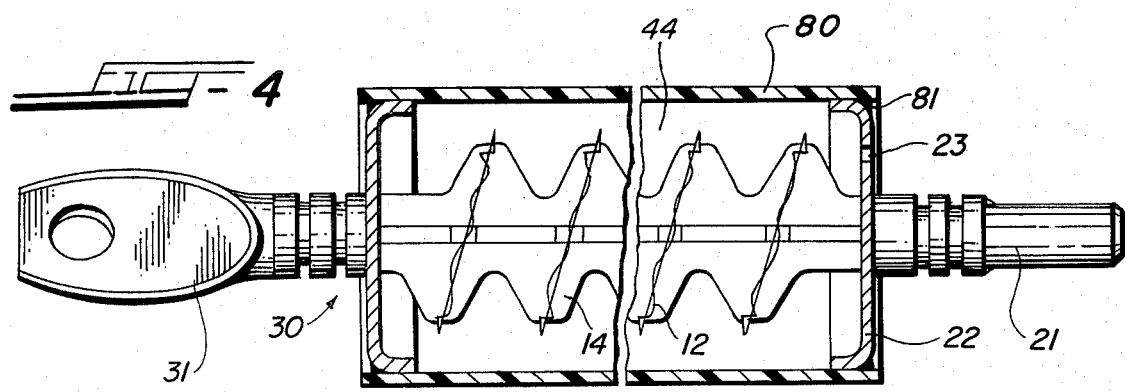

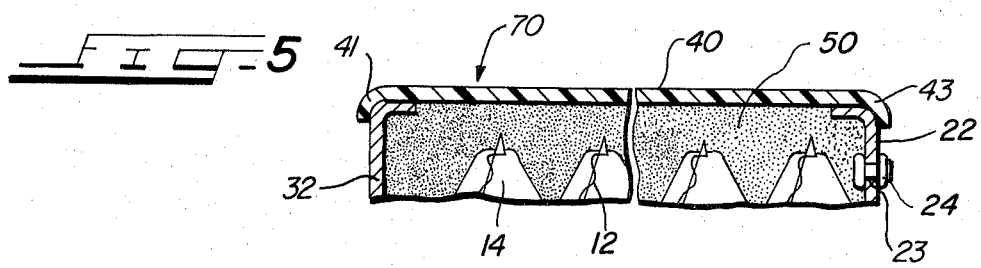
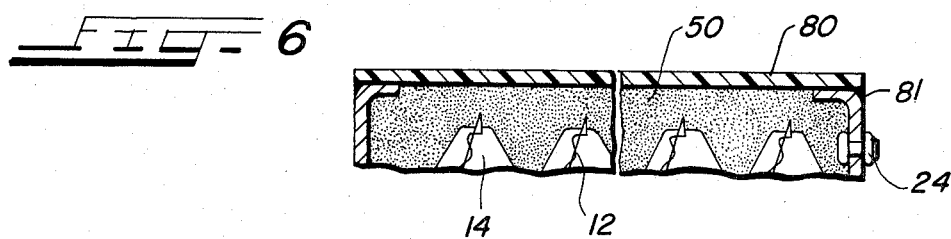
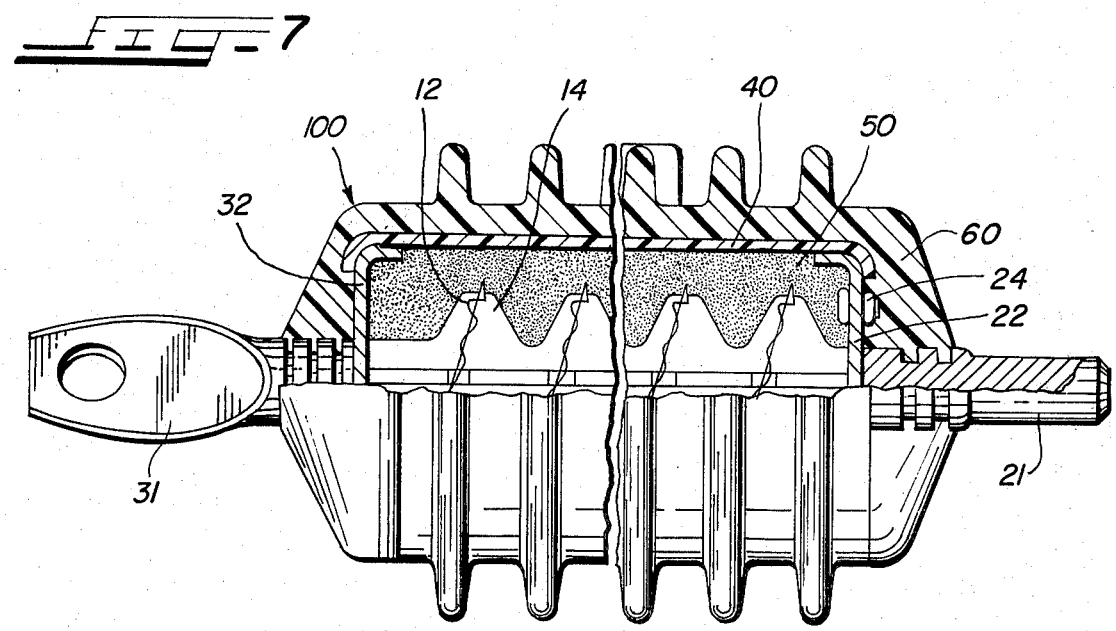

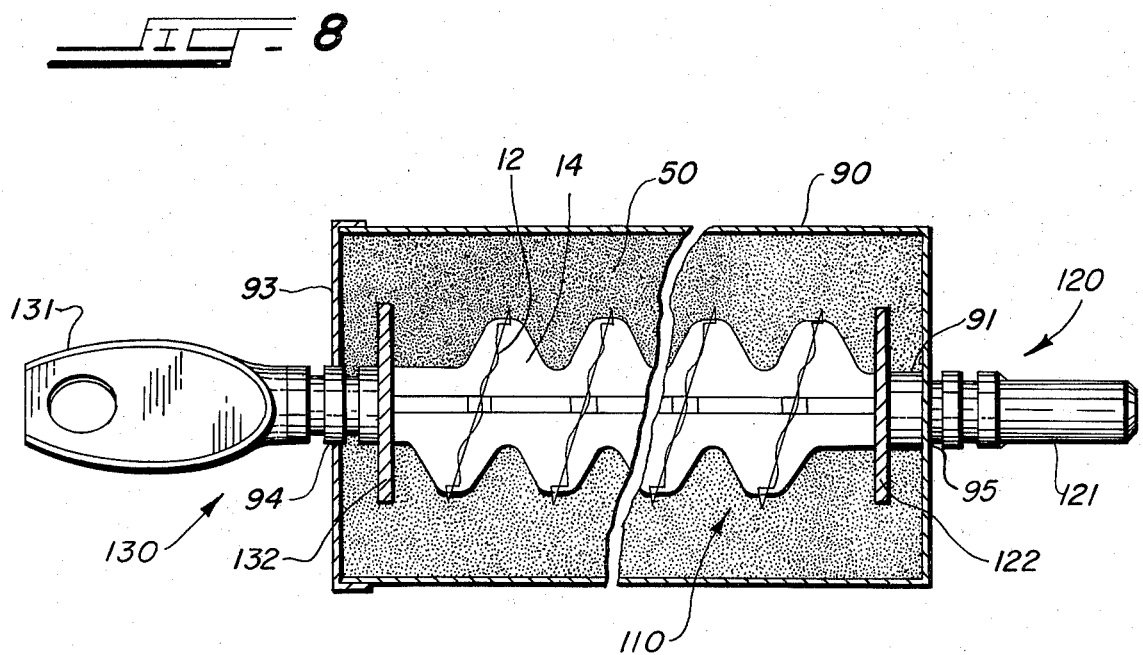

METHOD OF ASSEMBLING A FAULT LIMITER BY MOLDING A RIGID HOUSING ABOUT A NON-RIGID SUBASSEMBLY

BACKGROUND OF THE INVENTION

1. Field of the Invention

The present invention pertains to an improved method of assembling a fault limiter, and, more particularly, to a method of assembling a one-piece fault limiter which permits the desirable compression of the arc quenching material therein.

2. Description of the Prior Art

The prior art discloses the use of a rigid resin body to contain a fault limiter wherein the space between the fusible element and the rigid resin body is filled with a particulate arc quenching medium, as shown in pending U.S. patent application Ser. No. 817,985—Biller, filed July 22, 1977 now U.S. Pat. No. 4,135,174 issued Jan. 16, 1979 and assigned to the same assignee as the present invention, and U.S. Pat. No. 4,012,708—Goe, Jr. The prior art also recognizes the need to keep the arc quenching particles immobile, particularly in high voltage applications, as shown in U.S. Pat. No. 3,838,375—Frind, et al.

In order to confine particulate arc quenching materials around the fusible element, the prior art suggests mixing the particulate with some form of binder, thereby creating a rigid subassembly. Such a method is shown in U.S. Pat. No. 3,838,375—Frind, et al, and U.S. Pat. No. 3,166,656—Hollmann, et al. The introduction of the binder around the fusible element can impair the function of the arc quenching material since the high temperatures associated with the triggering of the fuse may cause the binder to break down. Since no binder is required in the present invention, this problem is overcome.

An alternative way to minimize shifting of the particulate arc quenching medium is to fill a premolded open-ended insulating housing therewith and to then vibrate or tap the housing after it is filled to help the arc quenching material to settle, as shown in U.S. Pat. No. 3,866,318—Kozacka. However, this method does not permit the use of a one piece insulator, and therefore reduces the structural integrity of the fault limiter, since a separate insulating cover must be attached to the pre molded housing after the housing is filled with the arc quenching material.

The present invention overcomes these obstacles since the arc quenching material is positioned around the fusible element prior to molding a one piece resin insulator around the internal portion of the device. In addition, the present invention accomplishes the desired ends of providing an immobile and compact arc quenching medium by permitting the shrinking action of the resin insulator to act directly on the arc quenching material as it cures by providing a flexible barrier to contain the arc quenching material while the insulator is molded around it.

BRIEF DESCRIPTION OF THE INVENTION

An improved method of manufacturing a fault limiter in accordance with the present invention has as its end the ability to compress the arc quenching material in a fault limiter of one piece construction. It is desirable, particularly in high voltage applications, to surround the fusible element of the fault limiter with some form of particulate arc quenching material such as quartz sand. For the arc quenching material to be optimally effective, it should be packed densely, and it should be immobile. The methods used by the prior art to achieve these ends all compromise the integrity of the fault limiter to some extent. For example, some of the prior art suggests the addition of a binder to the sand, but a binder may interfere with the insulating function of the sand. Other prior art suggests fabrication of the resin housing in two parts, thereby permitting the sand to be manually packed without the addition of a binder. However, the two piece housing required by this method is structurally weaker than one piece construction and will necessarily increase the risk that moisture will penetrate the device.

One embodiment of the present invention utilizes a fuse assembly comprising the fusible element wound around an element support member and connected to two terminal assemblies. Each of the terminal assemblies incorporates a ferrule the diameter of which is greater than the diameter of the rest of the subassembly. The terminal assemblies also include the terminals of the fault limiter. At least one of the terminal assembly ferrules incorporates a filler hole. A flexible cylindrical sleeve with a pre-formed lip at one end is slid over the ferrules of the terminal assemblies until the lip conformally engages and seals against one ferrule. The open end of the sleeve is then sealed against the other ferrule, thereby forming an enclosure around the fusible element. The enclosure is filled through the filler hole with a suitable arc quenching material, such as quartz sand. The filler hole is then sealed. The completed subassembly, supported by the terminals, is then placed in a split mold, and encapsulated in a resinous compound. As the resin cures, it shrinks about the subassembly thereby compressing the flexible cylindrical sleeve against the arc quenching material, thereby preventing the arc quenching material from shifting and maximizing its density.

In a first alternative embodiment of the present invention, a non-conducting flexible tube is affixed to the ferrules, in place of the sleeve. In all other respects, the first alternative embodiment is identical to the preferred embodiment.

In a second alternative embodiment of the present invention, instead of the sleeve utilized in the preferred embodiment, a flexible sleeve is formed directly onto the ferrules out of a flat sheet of flexible material, by affixing the edges of the sheet to the ferrules, and rolling the sheet onto the fuse assembly.

In a third alternative embodiment of the present invention, it is not necessary to have a hole in either of the terminal assemblies. The fusible element, element support member, and terminal assemblies are enclosed in a flexible cylindrical sleeve, with the terminals extending through holes in the ends of the sleeve. End ferrules are not used. The sleeve is filled with arc quenching material through a hole therein, and the hole is then closed. The completed subassembly is then encapsulated within a resinous compound as in the first embodiment.

Thus, it is a principal object of the present invention to prevent the shifting of the arc quenching material used in fault limiters without the need for the addition of a binder to the particulate arc quenching material.

It is a further object of the present invention to provide a means of fabricating a fault limiter housed in a one piece resinous housing without the need for adding a solidifying binder to the arc quenching material.

It is a further object of the present invention to provide a means of fabricating a fault limiter containing a particulate arc quenching material which is under compression without the need for using a two piece housing.

It is a further object of the present invention to eliminate the need for manually compressing the arc quenching material used in fault limiters.

These and other objects, advantages, and features of the present invention shall become apparent by reference to the following description of the preferred embodiments of the present invention, which description is presented by way of illustration and not limitation.

BRIEF DESCRIPTION OF THE DRAWINGS

FIG. 1 is a partial cross section view of the fuse assembly in accordance with present invention.

FIG. 2 is a partial cross section view of the subassembly in accordance with the present invention showing one method of forming a flexible subassembly by affixing a sleeve to the fuse assembly.

FIG. 3 is a partial cross section view of the subassembly in accordance with the present invention showing the subassembly after the open end of the flexible sleeve has been heat sealed to the terminal assembly.

FIG. 4 is a partial cross section view of the subassembly in accordance with the present invention showing a first alternative method of forming a flexible subassembly by attaching a flexible sheet or sleeve to the terminal assemblies with an adhesive.

FIG. 5 is a partial cross section view of the subassembly made in accordance with the method shown in FIG. 3 and showing the subassembly after it has been filled with arc quenching material and the hole has been plugged.

FIG. 6 is a partial cross section view of the subassembly made in accordance with the method shown in FIG. 4 and showing the subassembly after it has been filled with arc quenching material and the hole has been plugged.

FIG. 7 is a partial, fragmentary cross section view of the completed fault limiter formed by encapsulating the subassembly shown in FIG. 5 in an insulator.

FIG. 8 shows a second alternative method of forming a flexible container around the fuse assembly.

DETAILED DESCRIPTION OF THE PREFERRED EMBODIMENTS

With reference to FIG. 1, fuse assembly 10 of the preferred embodiment of the present invention comprises fusible element 12 which is wound around element support member 14. One end of fusible element 12 is electrically connected to first ferrule 22 of first terminal assembly 20. First terminal assembly 20 also comprises first terminal 21 which serves as a first external electrical connector. Hole 23 is formed in first ferrule 22. Similarly, the other end of the fusible element 12 is electrically connected to second ferrule 32 of second terminal assembly 30. Second terminal assembly 30 also comprises second terminal 31 which serves as a second external electrical connector. First ferrule 22 and second ferrule 32 provide mechanical support for element support member 14.

In the first preferred embodiment of the present invention, sleeve 40 made of a nonconducting, flexible material, such as: various polymers, including Mylar (thermoplastic terephthalate), polyethylene; paper; cardboard, fabric, rubber, etc. and including pre-formed annular cap 41 at one end and open end 43 at the other end, is slid over fuse assembly 10 as shown in FIG. 2. The inside diameters of sleeve 40 at its ends are approximately the same as the respective diameters of first ferrule 22 and second ferrule 32 so that, when the sleeve 40 is in place, volume 42 is formed between sleeve 40 and first ferrule 22 and second ferrule 32. Open end 43 of sleeve 40 can be heat sealed or glued or otherwise formed to first ferrule 22 to provide mechanical attachment, as shown in FIG. 3.

With reference to FIG. 5, volume 42 is completely filled through filler hole 23 with a suitable arc quenching material 50, such as quartz sand, and hole 23 is sealed with a plug 24 to form subassembly 70.

Completed subassembly 70, as shown in FIG. 5, is then placed in a conventional split mold and, except for first terminal 21 and second terminal 31, is encased in insulating resin 60 to form finished fault limiter 100, as shown in FIG. 7. The resin is of a type which volumetrically contracts upon curing, such as a cycloaliphatic epoxy resin, and which cures to a rigid, rugged state. As insulating resin 60 cures, it contracts against flexible sleeve 40, flexing the sleeve 40 inwardly thereby compressing arc quenching material 50. Under compression, the density of arc quenching material 50 is maximized, and, in addition, the force of compression prevents arc quenching material 50 from shifting around inside fault limiter assembly 100. Both maximum density and minimum shifting are desirable properties of the arc quenching medium for optimal fault limiting protection.

With reference to FIG. 4, a first alternative embodiment of the present invention substitutes nonconducting, flexible tube 80 for sleeve 40 (see FIGS. 2, 3 and 5) and achieves the same result by affixing flexible tube 80 to first ferrule 22 and second ferrule 23 with adhesive 81 or other attachment media. Flexible tube 80 need not incorporate a pre-formed annular cap. Volume 44 is formed between flexible tube 80, first ferrule 22, and second ferrule 23. With reference to FIG. 6, volume 44 is then filled with arc quenching material 50, and the rest of the method proceeds in the manner described above.

In a second alternative embodiment of the present invention, sleeve 80 (see FIGS. 4 and 6) is formed onto first ferrule 22 and second ferrule 32 out of a flat sheet of nonconducting, flexible material by gluing or otherwise affixing the edges of the sheet to first ferrule 22 and second ferrule 32 with an adhesive 81 or other medium and rolling the sheet onto fuse assembly 10. The end of the sheet is then glued down or otherwise formed, and the method proceeds in the manner described above. This embodiment would be substantially identical in appearance to that shown in FIGS. 4 and 6.

With reference to FIG. 8, a third alternative embodiment of the present invention utilizes a modified fuse assembly 110 which differs from the fuse assembly used in the other embodiments of the present invention in that it can incorporate first support member 122 and second support member 132, in lieu of first ferrule 22 and second ferrule 32, since the support members do not serve as the ends of the container. The fuse assembly 110 is inserted into a flexible cylindrical container 90 having one end open, and which contains a hole 95 at the other end to accommodate the first terminal 121 of first terminal assembly 120. Cylindrical container 90 is then filled with a suitable arc quenching material 50 through its open end. A cover 93 containing a hole 94 to accommodate the second terminal 131 of second terminal assembly 130 is then put into place over the open end of container 90. The completed subassembly is then placed in a split mold and encapsulated in a resinous compound, as in the prior embodiments. Since the container 90 is made out of a flexible material, as the resin cures it will compress the container against the arc quenching material, thereby preventing the arc quenching material from shifting and maximizing its density.

It should be understood that various changes, alterations and modifications can be made to the embodiments illustrated and described herein without departing from the spirit and scope of the present invention as described in the appended claims.

I claim:

1. An improved method of manufacturing a fault limiter wherein a fuse assembly having a fusible element connected to at least two terminals is sealed in a rigid insulated housing, the improvement comprising:

enclosing the fuse assembly except for a portion of the terminals in a flexible electrically non-conductive sleeve;

filling the volume enclosed by the sleeve with a pulverulent arc-quenching material, free of any binder; and molding an insulating material about the sleeve, except for a portion of the terminals, and compacting the arc-quenching material, said insulating material being of a composition which contracts as it sets to compact the arc-quenching material.

2. An improved method of manufacturing a fault limiter wherein a fuse assembly composed of a fusible element on an element support member and connected between two terminal assemblies is sealed in a rigid insulating housing, the improvement comprising:

surrounding the fuse assembly, except for a portion of each terminal assembly with an electrically non-conductive, flexible container having an opening therethrough;

filling the flexible container with a pulverulent arc-quenching material free of any binder through the opening;

closing the opening; and molding an insulating material around the container, except for the terminal assembly portions, and compacting the arc-quenching material, said insulating material being of a composition which contracts as it cures to compact the arc-quenching material.

3. An improved method of manufacturing a fault limiter as recited in claim 2, further comprising:

forming the walls of the flexible container from a flat sheet by affixing the sheet to the terminal assemblies so that the terminal assemblies form the ends of the container.

4. An improved method of manufacturing a fault limiter as recited in claim 2, further comprising:

forming the flexible container by affixing a flexible sleeve to the terminal assemblies so that the terminal assemblies form the ends of the container.

5. An improved method of manufacturing a fault limiter as recited in claim 2, further comprising:

forming the flexible container from a preformed sleeve which is sealed to the terminal assemblies so that the terminal assemblies form the ends of the container.

6. An improved method of manufacturing a fault limiter as recited in claim 2, claim 3, claim 4, or claim 5, wherein:

the insulating material is a cycloaliphatic epoxy resin.

7. An improved method of manufacturing a fault limiter as recited in claim 2, claim 3, claim 4, or claim 5, wherein:

the flexible container is made of a polymer, paper, fabric, or rubber.

8. An improved method of manufacturing a fault limiter as recited in claim 7, wherein:

the insulating material is cycloaliphatic epoxy resin; and the arc-quenching material is quartz sand.

* * * * *